May 15, 1962  F. CLAUDI-MAGNUSSEN  3,034,946
COATED AND LAMINATED PRODUCTS, COMPOSITIONS FOR PRODUCING
SAME AND PROCESSES OF EMPLOYING SUCH COMPOSITIONS
Filed Oct. 24, 1955

Finn Claudi-Magnussen
INVENTOR
BY
ATTORNEYS

3,034,946
COATED AND LAMINATED PRODUCTS, COMPOSITIONS FOR PRODUCING SAME, AND PROCESSES OF EMPLOYING SUCH COMPOSITIONS

Finn Claudi-Magnussen, Kenmore, N.Y., assignor to General Aniline & Film Corporation, New York, N.Y., a corporation of Delaware
Filed Oct. 24, 1955, Ser. No. 542,504
13 Claims. (Cl. 156—332)

This invention relates to new and useful coating and adhesive compositions, processes of employing same, and products produced by such processes and, in particular, adhesive compositions comprising polymethyl α-chloroacrylate and the use of such compositions in the coating and laminating of polymethyl methacrylate.

Methyl methacrylate polymer is a well known and useful plastic material possessing outstanding characteristics which render it extremely valuable for many purposes well known in the field of plastics. However, this polymeric material, while so useful, is, nevertheless, excluded from many fields because of great deficiencies of many other characteristics. Among the latter, in particular, are the poor surface properties of this polymer. This substance is possessed of such softness of surface that it is readily scratched and abraded upon normal handling—so much so that it is necessary to maintain the surface out of contact with other materials as much as possible in the handling thereof. A paper laminate is usually employed for this purpose. Additionally, the surface of polymethyl methacrylate exhibits severe crazing characteristics and the poor heat stability of the polymer, when subjected to shaping operations involving surface deformations, gives rise, in many instances, to a product having poor optical characteristics in view of chemical and physical changes occurring in the surface layers of the polymer.

It is, therefore, an object of this invention to provide new and useful compositions which may be applied to polymethyl methacrylate to overcome the deficiencies of the polymer itself.

It is a further object of this invention to provide new and useful compositions comprising polymethyl α-chloroacrylate which may be employed as a surface coating for polymethyl methacrylate.

It is a still further object of this invention to provide new and useful compositions comprising polymethyl α-chloroacrylate which may be employed in preparing laminates of polymethyl methacrylate.

Another object of this invention is to provide processes employing new and useful compositions comprising polymethyl α-chloroacrylate in the coating and laminating of polymethyl methacrylate.

These and other objects and advantages of this invention will appear from the following description of preferred forms thereof, and from the drawings illustrating such forms wherein.

Figure 1:
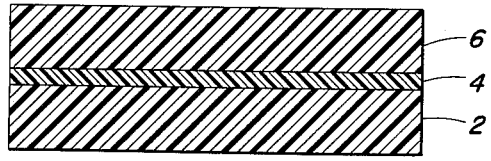
FIG. 1 is a cross-sectional view of one form of laminated structure of this invention.
Figure 2:
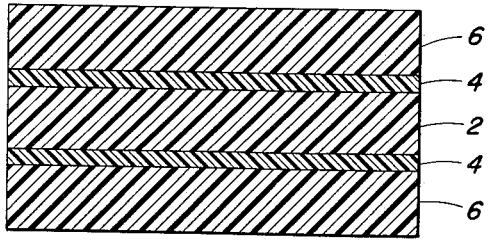
FIG. 2 is a cross-sectional view of another form of laminated structure prepared in accordance with this invention.
Figure 3:
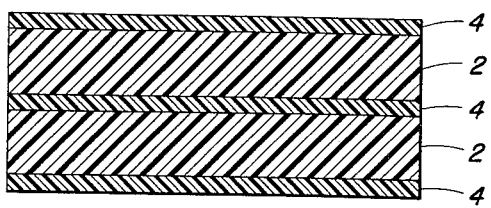
FIG. 3 is a cross-sectional view of a further form of the invention.

Polymethyl α-chloroacrylate is an unusual resinous material possessing outstanding heat- and light-stability characteristics and, further, exhibiting excellent surface hardness characteristics. Additionally, this polymer, because of its extreme inertness and stability, exhibits practically no surface crazing in normal usage.

It was unexpectedly discovered that solution of such a polymeric substance could be employed to effect the surface coating of methyl methacrylate polymers, whereby the many advantages of the polymethyl α-chloroacrylate would accrue to the resultant coated methyl methacrylate polymer. This unexpectedness arises from the fact that the polymethyl α-chloroacrylate is difficult to dissolve in the common organic solvents and diluents and known solutions of this polymer fail to give sufficient adhesion to methyl methacrylate polymer surfaces to make such coated products useful. Thus, it is known that polymethyl α-chloroacrylate may be dissolved in such solvents as methylene-chloride, chloroform and nitrobenzene, but such solutions are completely inoperative in preparing coatings of the methyl α-chloroacrylate polymer on methyl methacrylate polymer. Additionally, heretofore all attempts to laminate polymethyl α-chloroacrylate to methyl methacrylate polymer were unsuccessful, whereas such laminates exhibiting excellent adhesion characteristics are efficaciously prepared by the novel compositions of this invention.

The coating and laminating compositions of this invention comprise, in general, a solution of polymethyl α-chloroacrylate in a specifically selected solvent from the group of solvents N,N-dimethyl-formamide and 2-propyn-1-ol, and esters of the latter, such as propargyl acetate, propargyl propionate, propargyl sulfate, propargyl phosphate, and the like. Diluents may also be added to such solvents without adversely affecting the bonding strength of the coating and laminating compositions. Such diluents include acetone, toluene, ethyl acetate, and the like.

In the process for effecting the surface coating of polymethyl methacrylate, a solution of the polymethyl α-chloroacrylate containing from about 1–10% of the latter in one of the aforementioned solvents is employed. In order that a successful bond be achieved between the coating and the base polymer, it is necessary that the coating composition be dried at a temperature in the range of about 75° to 100° C.

By carrying out the process in accordance with such teaching, one may obtain a coated methyl methacrylate polymer having a hard surface layer of the polymethyl α-chloroacrylate and the composite structure exhibits the desirable properties mentioned above attributable to the polymethyl α-chloroacrylate. Unless the process is carried out in the manner described and the temperature for drying the coating composition kept within the limits of 75° to 100° C., the resultant product is hazy and at the interface between the two polymers fine cracks will show up. Additionally, strains along the edges of the coated product at the interface will develop unless the procedure of this invention is followed.

In preparing laminated products comprising on the one hand a polymethyl methacrylate sheet and on the other, a polymethyl α-chloroacrylate sheet, it is again necessary to maintain the temperature, at which the lamination is carried out, between the limits of 75° to 100° C. It is also preferable during such laminating procedures to apply pressure to the laminated assembly of the order of 2000 lbs. per square inch for about 15 minutes. Before the pressure on the assembly is released, the temperature should be permitted to drop to below about 75° C. in order that proper bonding be made.

Referring now to the drawings and the various figures, numeral 2 indicates a pre-formed sheet of polymethyl methacrylate, numeral 4 indicates a coating of polymethyl α-chloroacrylate, and numeral 6 a pre-formed lamina of polymethyl α-chloroacrylate.

The following examples will serve to illustrate the present invention without being deemed limitative thereof.

Example 1

One g. polymethyl α-chloroacrylate in finely divided form (Fikenstscher K value of 101.2) is dissolved in 100 mls. N,N-dimethylformamide. This solution is sprayed on a sheet of methyl methacrylate polymer at room temperature. The coated product is then dried at 80° C., whereby a clear, colorless, hard surface layer having excellent adhesion to the base sheet is obtained.

*Example 2*

The procedure of Example 1 is repeated except that the coating composition is brushed on the base sheet. The results obtained are comparable to those of Example 1.

*Example 3*

One g. finely divided methyl α-chloroacrylate polymer (Fikentscher K value of 101.2) is dissolved in 100 mls. of 2-propyn-1-ol (propargyl alcohol). This solution is then applied at room temperature to a base of polymethyl methacrylate, both by brushing and spraying techniques. The coated products in both cases are dried at 85° C. and the resultant coated products exhibit the same outstanding properties as those of Examples 1 and 2.

*Example 4*

Two sheets of polymethyl methacrylate are coated on both sides with the compositions of Examples 1 and 3, respectively. The coated products are dried at 80° C. and 85° C., respectively, whereby clear, colorless, hard, and adherent surface layers on both sides of the base sheet are obtained.

*Example 5*

A 10% solution of polymethyl α-chloroacrylate in N,N-dimethylformamide is brushed onto a 1″ thick block of methyl methacrylate polymer. The coated product is dried at 75° C., whereby a clear, colorless, hard, tenacious surface layer on the methyl methacrylate polymer is obtained.

*Example 6*

The procedure of Example 4 is repeated except that propargyl alcohol is employed in lieu of N,N-dimethylformamide. Similar properties of the coated base are obtained.

*Example 7*

A 5% solution of methyl α-chloroacrylate polymer in propargyl acetate is applied to a sheet ¼″ thick of methyl methacrylate polymer. The coated product is dried at 90° C., whereby a clear, colorless, hard, and strongly adherent structure is obtained.

*Example 8*

Two sheets prepared in the manner described in Example 1 are assembled with the coated faces together. A pressure of about 2000 lbs. per square inch is applied and the temperature raised to about 85° C. This pressure and temperature is maintained for about 15 minutes, then the temperature is lowered to about 60° C. The pressure is then released and the laminate removed. The result is a clear, strong, colorless bond.

*Example 9*

One sheet of the product prepared in the manner of Example 2 is placed upon a sheet of polymethyl α-chloroacrylate with a coating on the first mentioned sheet between the two sheets. This assembly is then laminated in the manner described in Example 7 above, whereby the resultant laminate is clear and the bond between the two laminae being strong and colorless.

*Example 10*

A solution of 5 g. polymethyl α-chloroacrylate in 100 mls. propargyl sulfate is applied to a ¼″ sheet of methyl methacrylate polymer by spraying thereon. The coating is dried at a temperature of 75° C. To the coated side of the base sheet there is then applied a ¼″ sheet of polymethyl α-chloroacrylate. A pressure of 1500 lbs. per square inch is applied to the assembly and the temperature raised to 100° C. and maintained thereat for 20 minutes. Before the pressure is released, the temperature of assembly is dropped to about 50° C., after which the laminated structure is removed from between the pressure plates. The resultant structure exhibits a strong, clear and colorless bond.

*Example 11*

A solution of 5 g. polymethyl α-chloroacrylate in 100 mls. propargyl alcohol is applied to a ¼″ sheet of methyl methacrylate polymer by spraying thereon. The coating is dried at a temperature of 75° C. To the coated side of the base sheet there is then applied a ¼″ sheet of polymethyl α-chloroacrylate. A pressure of 1500 lbs. per square inch is applied to the assembly and the temperature raised to 100° C. and maintained thereat for 20 minutes. Before the pressure is released, the temperature of assembly is dropped to about 50° C., after which the laminated structure is removed from between the pressure plates. The resultant structure exhibits a strong, clear and colorless bond.

*Example 12*

Seven g. finely divided methyl α-chloroacrylate polymer are dissolved in a solvent diluent combination comprising 100 mls. propargyl alcohol and 100 mls. acetone. This solution is applied by spraying to a sheet ¼″ thick polymethyl methacrylate. The coating is dried at 80° C., whereby a clear, hard, transparent and firmly anchored coating on the base polymer sheet is obtained.

*Example 13*

To the coated side of a sheet prepared as in Example 10, there is applied a further sheet of polymethyl α-chloroacrylate ⅛″ thick. The assembly is then mounted between pressure plates and a pressure of 2000 lbs. per square inch is then applied. The temperature of the assembly is then raised to 90° C. and maintained thereat for 15 minutes. Thereafter, the temperature is permitted to drop to 60° C. and the pressure on the laminated structure is released. The resultant product is clear, transparent and colorless. Attempts to fracture the bond between the two polymer sheets result in a break-up of the sheets themselves, rather than of the bond.

*Example 14*

Two sheets are prepared in the manner of Example 4 using the coating composition of Example 1. The two sheets are then laminated at a temperature of 90° C. and at a pressure of 1600 lbs. per square inch.

This invention has been disclosed with respect to certain preferred embodiments. Various modifications and variations of these embodiments will become apparent to those skilled in the art, and it is to be understood that such modifications and variations are to be included within the spirit and purview of this application and the scope of the appended claims.

I claim:

1. A process for coating polymethyl methacrylate which comprises applying a solution of polymethyl α-chloroacrylate in a solvent selected from a group consisting of N,N-dimethylformamide, 2-propyn-1-ol and esters thereof, to a polymethyl methacrylate base and drying the coating at a temperature of 75° to 100° C.

2. A process as defined in claim 1 wherein the ratio of polymethyl α-chloroacrylate to solvent is from 1:100 to 10:100.

3. A process for coating comprising applying a solution of polymethyl α-chloroacrylate in N,N-dimethylformamide solvent and wherein the ratio of polymer to solvent is from 1:100 to 10:000, to a polymethyl α-methacrylate base, and drying the coating at a temperature of 75° to 100° C.

4. A process of coating comprising applying a solution of polymethyl α-chloroacrylate in 2-propyn-1-ol solvent and wherein the ratio of polymer to solvent is from 1:100 to 10:100 to a polymethyl α-methacrylate base, and drying the coating at a temperature of 75° to 100° C.

5. A process for coating comprising applying a solution comprising 1 part polymethyl α-chloroacrylate in 100 parts of N,N-dimethylformamide to a polymethyl methacrylate base, and drying the coating at a temperature of about 80° C.

6. A process for coating comprising applying a solution comprising 1 part polymethyl α-chloroacrylate in 100 parts of 2-propyn-1-ol to a polymethyl methacrylate base, and drying the coating at a temperature of about 85° C.

7. A process for preparing a polymethyl α-chloroacrylate surfaced polymethyl methacrylate base comprising applying to said base a solution comprising from 1 to 10 parts polymethyl α-chloroacrylate in 100 parts of a solvent selected from the group consisting of N,N-dimethylformamide, 2-propyn-1-ol and esters thereof, to the polymethyl methacrylate base, and drying the resultant treated base at a temperature of about 75° to 100° C.

8. A process for preparing a hard surfaced polymethyl methacrylate composite structure which comprises applying a solution comprising from 1 to 10 parts of polymethyl α-chloroacrylate in about 100 parts of a solvent selected from the group consisting of N,N-dimethylformamide, 2-propyn-1-ol and esters thereof, to a polymethyl methacrylate base, drying said solution at a temperature of 75° to 100° C., applying to the coated side of said coated polymethyl methacrylate base a preformed sheet of polymethyl α-chloroacrylate, applying pressure thereto at a temperature of about 75° to 100° C., and cooling to below about 75° C.

9. A process of laminating comprising applying a solution comprising 1 part polymethyl α-chloroacrylate in 100 parts N,N-dimethylformamide to a polymethyl methacrylate base, drying the coated base at a temperature of 80° C., applying to said coated base and to the coated side thereof a preformed sheet of polymethyl α-chloroacrylate, and laminating the resultant assembly under a pressure of about 2000 lbs. per square inch, at a temperature of about 85° C.

10. A process of laminating comprising applying a solution comprising 5 parts polymethyl α-chloroacrylate in 100 parts of 2-propyn-1-ol to a polymethyl methacrylate base, drying the coating at a temperature of about 75° C., applying to the coated side of the said coated base a preformed sheet of polymethyl α-chloroacrylate, and laminating the resultant assembly under a pressure of about 1500 lbs. per square inch, at a temperature of about 100° C.

11. A process of laminating comprising applying a solution comprising 7 parts of polymethyl α-chloroacrylate in 100 parts of 2-propyn-1-ol and 100 parts acetone to a polymethyl methacrylate base, drying the coating at a temperature of 80° C., applying to the coated side of said coated base a preformed sheet of polymethyl α-chloroacrylate, and maintaining the resultant structure under a pressure of about 2000 lbs. per square inch, at a temperature of about 90° C.

12. A process of laminating comprising superimposing two sheets of polymethyl methacrylate each coated on both sides with a layer of polymethyl α-chloroacrylate and subjecting the assembly to a temperature of from about 75° C. to about 100° C. and a pressure sufficient to effect a bonding of the said sheets.

13. A process as set forth in claim 12 wherein the temperature is about 90° C. and the pressure is about 1600 lbs. per square inch.

References Cited in the file of this patent

UNITED STATES PATENTS

| | | |
|---|---|---|
| 2,320,533 | Muskat et al. | June 1, 1943 |
| 2,346,036 | Leary | Apr. 4, 1944 |
| 2,464,826 | Neher et al. | Mar. 22, 1949 |
| 2,649,427 | Marvel | Aug. 18, 1953 |
| 2,649,438 | Bruson | Aug. 18, 1953 |
| 2,649,481 | Caldwell | Aug. 18, 1953 |
| 2,788,306 | Cox et al. | Apr. 9, 1957 |
| 2,825,672 | Koblitz et al. | Mar. 4, 1958 |
| 2,834,763 | Halpern et al. | May 13, 1958 |
| 2,847,399 | Melamed | Aug. 12, 1958 |
| 2,850,478 | Coover et al. | Sept. 2, 1958 |
| 2,854,436 | Corbiere et al. | Sept. 30, 1958 |
| 2,941,917 | Anspon et al. | June 21, 1960 |

OTHER REFERENCES

Journal of Amer. Chem. Society, October 1942, pages 2389–2393.